Sept. 10, 1957  L. L. HOFFER  2,805,619
HAND NEEDLE DEVICE FOR THREADING TWINE
THROUGH A BALE OR OTHER BUNDLE
Filed Nov. 23, 1954
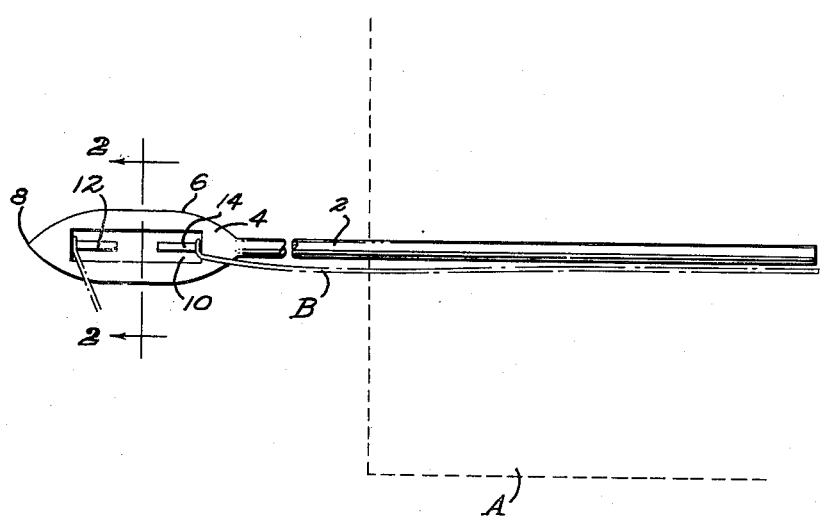
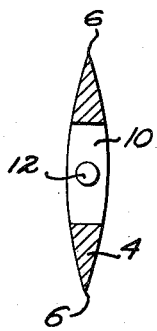
INVENTOR
Lawrence L. Hoffer
BY Scrivener + Parker
ATTORNEYS

United States Patent Office 2,805,619
Patented Sept. 10, 1957

2,805,619

HAND NEEDLE DEVICE FOR THREADING TWINE THROUGH A BALE OR OTHER BUNDLE

Lawrence L. Hoffer, Sperry, Iowa

Application November 23, 1954, Serial No. 470,779

2 Claims. (Cl. 100—24)

This invention provides a device for threading twine through a bale of hay or similar bundle.

In the operation of an automatic haybaling machine which wraps the bale with twine, the twine will often break or the supply of twine will become exhausted and, in either event, one or more bales will be formed which, unless bound by hand, will break upon ejection from the loading chute. In the event of such breakage or exhaustion of the twine it becomes necessary for the operator to tie the bale by hand and in order to do this the twine must be pushed or pulled through the bale. Heretofore this has been done in some makeshift manner which is inefficient and time-consuming. It has accordingly been the object of the present invention to provide a device which may be manipulated either to push or pull twine through a bale with entire safety to the operator, which may be easily and quickly operated, and which will be inexpensive to manufacture.

The device provided by the invention is illustrated in the drawings forming part of this application, in which:

Fig. 1 is a side elevational view of a twine threading needle according to the invention, and Fig. 2 is a cross-sectional view of the head of the needle, taken on line 2—2 of Fig. 1.

The twine threading needle provided by the invention comprises an elongated shaft part 2, which may be formed of any suitable material but is preferably formed of metal, and which may have any suitable cross-sectional shape but is preferably circular in cross section. At its one end the shaft 2 is provided with a flattened head part 4 which preferably has a greater maximum width than the diameter of the shaft. This head tapers from its central part toward both its sides and toward its outer end to provide a sharp peripheral edge 6 which lies in the median transverse plane of the head and which tapers to a sharp point 8 at the outer end of the head. The head is provided with an opening 10 which, in the disclosed embodiment, extends entirely through the head and is rectangular in shape and elongated in the direction of the length of the head and shaft. Two oppositely extending pins 12, 14 are provided within this opening and are attached at their one ends to the head. Pin 12 extends from the forward end of the opening, which is the end adjacent the point 8, toward the shaft 2, while pin 14 extends from the rear end of the opening, which is the end adjacent the shaft 2, toward the point 8. The free ends of the pins are spaced apart and the pins are preferably axially aligned with each other and with the axis of the shaft 2 although such alignment and concentricity are not essential to the invention.

The device provided by the invention may be used either to push or to pull twine through a bale of hay A or a similar bundle. If it is to be used to push twine through the bale, the twine B is first looped about the rear pin 14 and the head 4 is then forced completely through the bale and will carry the twine with it. If the device is to be used to pull twine through the bale, the head is first forced through the bale without twine. The twine is then looped about the forward pin 12 and the head is pulled back through the bale, pulling the twine with it. It will be apparent that it will not be necessary to tie the twine to either pin as the pressure of the material of the bale will hold the twine on the pin about which it is looped. The device thus enables the operator quickly and safely either to push or pull the twine through the bale, depending on which side of the baler he is working from.

While I have described and illustrated in this application one form which my invention may take, it will be apparent to those skilled in the art that other embodiments of the invention, as well as modifications of that disclosed, may be made and practised without departing in any way from the spirit or scope of the invention, for the limits of which reference must be had to the appended claims.

What is claimed is:

1. A device for pushing or pulling twine through a bale of hay or similar bundle, comprising an elongated shaft having a flattened head at one end thereof which has a pointed outer end and a sharp, continuous, un-interrupted peripheral edge and which has an opening formed therethrough, and two pins within said opening attached at their one ends to the head and extending respectively in the direction of the shaft and in the direction of the pointed end of the head and having their free end spaced apart.

2. A device for pushing or pulling twine through a bale of hay or similar bundle, comprising an elongated shaft having a flattened head at one end thereof having a maximum width greater than the diameter of the shaft and which tapers from its center toward both its sides and toward its outer end to provide a sharp, continuous, un-interrupted peripheral edge tapering to a pointed outer end, said head having an elongated opening therethrough extending longitudinally of the head and shaft, and two pins within said opening extending respectively from the end thereof adjacent the pointed end and from the end thereof adjacent the shaft, said pins being axially aligned with each other and with the axis of the shaft and having their free ends spaced apart.

References Cited in the file of this patent

UNITED STATES PATENTS

| 212,227 | Howell | Feb. 11, 1879 |
| 713,791 | Orman | Nov. 18, 1902 |
| 721,588 | Manwaring | Feb. 24, 1903 |
| 745,769 | Bieman | Dec. 1, 1903 |
| 2,619,028 | Jay | Nov. 25, 1952 |

FOREIGN PATENTS

| 17,003 | Great Britain | Aug. 4, 1903 |